Dec. 6, 1949 R. J. COCHRAN 2,490,417
METHOD OF MAKING ELECTRIC BLANKETS
Filed June 28, 1946

Inventor.
Raymond J. Cochran
By
Soans, Pond & Anderson
Attys.

Patented Dec. 6, 1949

2,490,417

UNITED STATES PATENT OFFICE 2,490,417

METHOD OF MAKING ELECTRIC BLANKETS

Raymond J. Cochran, Fairfield, Conn., assignor to Simmons Company, New York, N. Y., a corporation of Delaware Application June 28, 1946, Serial No. 680,272

2 Claims. (Cl. 219—46)

The invention relates to improvements in blankets and is particularly useful in the manufacture of a blanket arranged to receive or contain electric conductors which are to be supplied with electric current for the purpose of heating the blanket.

The invention will be described in connection with the manufacture of a duplex blanket containing, or adapted to receive, between the plies of the structure, parallel lengths of an electric cord or conductor, which lengths are located or are to be located in parallel pockets formed between the plies and bounded by parallel rows of stitches which define the edges of the pockets and prevent excessive lateral movement of the lengths of the conductor.

The principal objects of the invention are to provide a type of construction and a method of manufacture which will enable the plies of the duplex structure to be made or woven separately and subsequently assembled into a composite duplex structure; to provide a structure in which the outer surface of the blanket is free from any unsightly indication that the duplex blanket contains electric wiring or is equipped with pockets to receive electric wiring; to provide a structure in which the blanket parts may be composed almost entirely of 100% wool fiber if desired and in which the outer surfaces of the blanket can be given a high degree of nap without danger of impairing the efficiency or durability of the heating elements or other parts of the complete structure; to provide a method of manufacture which can be practiced with economy and efficiency and which will lend itself to the use of automatic or semi-automatic mass production methods and machinery, and in general to provide an improved, efficient and economical structure and method of the character referred to.

Figure 1:
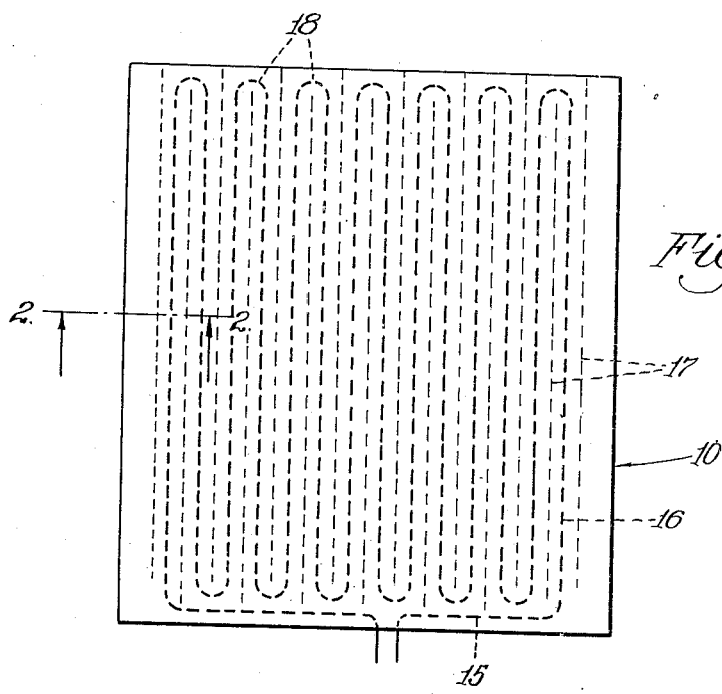
Fig. 1 is a plan view showing somewhat diagrammatically a blanket constructed in accordance with my invention.
Figure 2:
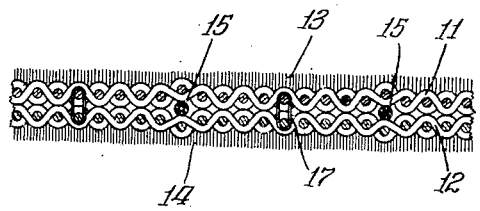
Fig. 2 is a section taken on the line 2—2 of Fig. 1.

Referring to Figs. 1 and 2, it will be seen that the blanket represented in Fig. 1 by the numeral 10 is composed of a pair of plies 11 and 12 each of which is a separate ply or sheet of textile material woven in the manner in which blankets are usually made, i. e. from warp and weft threads. The threads from which the plies are woven may be 100% wool fiber or whatever material is found to be best fitted for the manufacture of the usual wool blanket of good quality.

After each of the plies 11 and 12 have been separately woven, the surfaces of said plies which are to be the outside faces of the finished duplex structure are napped in a napping machine in the usual manner, which napping is indicated at 13 and 14 in Fig. 2.

It is desired to assemble together the separate plies 11 and 12 as shown in Fig. 2 in such manner as to form the composite unitary structure shown in plan view in Fig. 1 in which the spaced parallel lengths of the heater wire 15 are located in pockets between the plies 11 and 12 and in which the parallel lengths 16 of the heater wire are prevented from moving laterally out of place by means of rows of connections 17 extending between the plies 11 and 12, which rows of connections form pockets in which the lengths 16 of the heater wire are loosely contained or enclosed.

In Fig. 1, I have indicated that the heater wire 15 is continuous, the parallel lengths of wire 16 being connected at their ends by integral loops as indicated at 18. However, other methods of connection may be employed.

In addition to the heater wire elements 16, the pockets formed by the rows of connections 17 may also contain other wires or conductors, for example control wires or feeler wires, which may be more or less intimately associated with the heater wire 15.

In making my improved blanket, it will be found advantageous to use machinery which is automatic or semi-automatic in its operation, which automatic machinery, however, forms no part of the present invention, and therefore I will describe the method in connection with the employment of relatively simple equipment. For example, the invention can be practiced successfully by the use of the equipment illustrated in Fig. 3. In said Fig. 3, those portions of the plies of the blanket which have not yet been assembled together are indicated at 19 and 20, while those which have been assembled together are numbered 21 and 22. It will be seen that the connected portions 21 and 22 of the duplex blanket in course of manufacture extend downwardly from a throat or vise opening indicated at 23.

Said throat 23 is formed by a pair of bars 24 and 25 long enough to extend from one edge of the blanket to the opposite edge. Said bars are keyed to shafts 26 and 27, respectively, at their lower ends, and said shafts 26 and 27 are supported in a plurality of bearing lugs 28 and 29 supported on the ends of fixed spaced standards 30 and 31. On the lower ends of the bars 25, below the bearings 28 and 29, there are formed a series of lower extensions 32 and 33, and between said lower extensions 32 and 33 and the adjacent standards 30 and 31, there are interposed compression springs 34 and 35 which serve to force the lower extensions 32 and 33 outwardly in opposite directions from each other and thereby close the vise elements 24 and 25, thereby gripping the plies 21 and 22 of the blanket within the throat or vise opening 23. The vise may be released whenever desired by moving towards each other the handles 36 and 37 on the ends of one of the extensions 32 and 33.

It will be observed that the ends of the vise bars 24 and 25 are made quite sharp at their upper edges 38 and 39. This brings the upper ends of the parts 21 and 22 quite close together. The other separate ply portions 19 and 20 are folded back over said sharp edges 38 and 39 to form a divergent angle indicated at D in Fig. 3 and thereby expose the adjacent inner surfaces of the ply portions 19 and 20 close to the line or zone where they are held together in the vise. This gives enough space or working room, so that said abutting edges of the plies can be sewed together with a row of concealed stitches extending the complete length, or approximately the complete length, of the vise from one edge of the blanket to the opposite edge. Each of these stitches ties together the adjacent abutting inner surfaces of the two plies, but preferably does not extend through to the outside of the plies to such an extent as to render the stitch visible from the outside of the blanket when the structure is completed.

It is ordinarily not necessary to run all of these rows of stitches right out to the edge of the blanket. As a matter of fact, it may be undesirable to do so, because it may be necessary to provide access between adjacent pockets in order to accommodate the loops 18 which connect the adjacent lengths 16 of heater wire.

Figure 3:
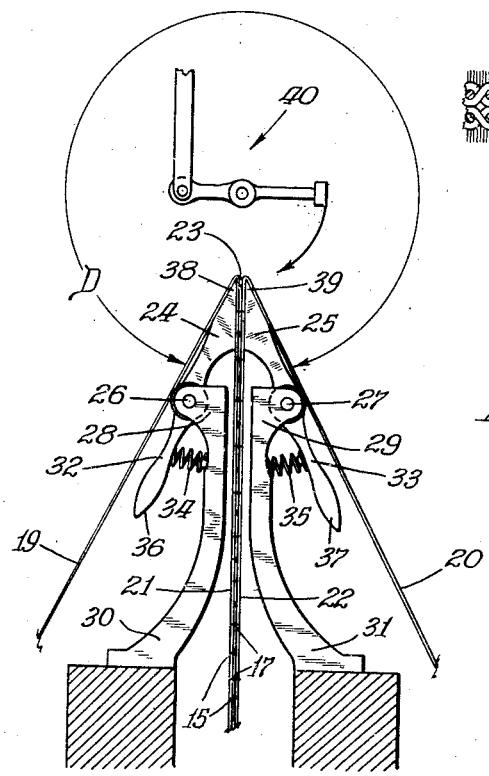
Fig. 3 is an elevation of a simple form of equipment which may be employed for practicing the improved method used for making my improved structure.

The blind or concealed stitches to which reference has been made may be inserted by hand, but it will probably be found more convenient to employ a so-called "blind stitch" machine, for example a Lewis blind stitch machine, which is indicated diagrammatically at 40 in Fig. 3. Suitable arrangements may be made for guiding the blind stitch machine and causing relative travel of the machine and vise elements.

The operation of the relatively simple equipment just described will be apparent to a person skilled in the art. After the first row of stitches has been applied between the adjacent abutting edges of the two strip portions of the blanket which have been brought together in the vise, the vise is released and then the connected portions of the blanket are drawn downwardly a distance equal to the width of the pocket. The parts of the vise are then brought together again so as to clamp together other adjacent strip portions of the divergent extensions 19 and 20, and another row of stitches is then applied, the operation being repeated successively step by step until the entire width of the blanket has been brought together and formed into pockets, as shown in Fig. 1.

If desired, a duplex blanket structure with concealed pockets therein, made in accordance with the aforesaid method, can be equipped or loaded with a heater conductor by means of some appropriate type of shuttle or the like, after the duplex structure is completed. However, the method of manufacture above described enables the heater wire to be inserted without the use of a shuttle or similar device. This may be done by inserting or depositing the cord or wire in the throat of the device just above a completed row of stitches, before advancing the blanket downwardly preparatory to inserting a subsequent row of stitches. Such method of operation is of considerable economic advantage, especially where it is desired to employ automatic machinery for effecting relative longitudinal movement of the sewing machine and vise.

I claim:

1. Method of making a 2-ply blanket for containing an electric heater wire, which comprises separately weaving the individual plies, napping one surface of each ply, bringing together strips of the 2 plies so that the inner surfaces of the strips will make a zone of contact with each other while the lateral extensions of said strips will diverge from each other on one side of said zone of contact, then, by the use of a sewing means located in the space made available by the divergence of said extensions, connecting together the opposed inner faces of said plies adjacent said zone of contact by a continuous line of interconnected stitches extending in a row extending parallel to said zone, placing between said extensions adjacent to, and parallel with, said row of stitches, a length of electric heater wire, then bringing together other strip portions of the divergent extensions so as to enclose said wire between said other strip-portions, and inserting another continuous row of similar interconnected stitches parallel with and spaced from the first row, and repeating said operation so as to form step by step a 2-ply structure in which the plies are connected together by parallel rows of concealed stitches forming parallel pockets between said plies enclosing spaced parallel lengths of heater wire.

2. Method of making a 2-ply blanket adapted to receive an electric heater wire, which comprises separately weaving the individual plies, separately napping those surfaces of the individual plies which are to be the outside faces of the finished duplex structure, bringing together strips of the 2 plies so that the inner surfaces of the strips will make a zone of contact with each other while the lateral extensions of said strips will diverge from each other on one side of said zone of contact, then, connecting together the opposed inner faces of said plies adjacent said zone of contact by a continuous series of interconnected stitches extending in a line parallel to said zone by the use of a sewing means located in the space made available by the divergence of said extensions and contemporaneously effecting relative travel between the sewing means and the contacting strips of the individual plies, then bringing together other strip portions of the divergent extensions and inserting another row of similar stitches parallel with and spaced from the first row, and repeating said operation so as to form step by step a 2-ply structure in which the plies are connected together by parallel rows of concealed stitches forming parallel pockets between said plies.

RAYMOND J. COCHRAN.

REFERENCES CITED

The following references are of record in the file of this patent:

UNITED STATES PATENTS

| Number | Name | Date |
| --- | --- | --- |
| 434,250 | Coles | Aug. 12, 1890 |
| 1,320,457 | De Voe | Nov. 4, 1919 |
| 1,416,481 | Longoria | May 16, 1922 |
| 2,313,864 | Crise | Mar. 16, 1943 |
| 2,393,182 | Newell | Jan. 15, 1946 |